United States Patent
Lv

(10) Patent No.: US 12,368,902 B2
(45) Date of Patent: Jul. 22, 2025

(54) FUNCTIONAL COMPONENT LOADING METHOD AND DATA PROCESSING METHOD FOR VIDEO LIVE-STREAMING, AND DEVICE

(71) Applicant: Beijing Bytedance Network Technology Co., Ltd., Beijing (CN)

(72) Inventor: Peng Lv, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 0 days.

(21) Appl. No.: 18/253,816

(22) PCT Filed: Jan. 6, 2022

(86) PCT No.: PCT/CN2022/070528
§ 371 (c)(1),
(2) Date: May 22, 2023

(87) PCT Pub. No.: WO2022/152041
PCT Pub. Date: Jul. 21, 2022

(65) Prior Publication Data
US 2024/0146978 A1 May 2, 2024

(30) Foreign Application Priority Data
Jan. 13, 2021 (CN) .......................... 202110040657.0

(51) Int. Cl.
*H04N 21/236* (2011.01)
*H04N 21/2187* (2011.01)
(Continued)

(52) U.S. Cl.
CPC ............................. *H04N 21/2187* (2013.01)

(58) Field of Classification Search
None
See application file for complete search history.

(56) References Cited

U.S. PATENT DOCUMENTS
2014/0111699 A1  4/2014 Kim
2015/0135234 A1  5/2015 Hall
(Continued)

FOREIGN PATENT DOCUMENTS
CN  101964790 A  2/2011
CN  105828204 A  8/2016
(Continued)

OTHER PUBLICATIONS

ISA China National Intellectual Property Administration, International Search Report Issued in Application No. PCT/CN2022/070528, Mar. 8, 2022, WIPO, 14 pages.
(Continued)

*Primary Examiner* — Brian T Pendleton
*Assistant Examiner* — Jean D Saint Cyr
(74) *Attorney, Agent, or Firm* — Alleman Hall & Tuttle LLP

(57) ABSTRACT

Embodiments of the present disclosure provide a functional component loading method and data processing method for video live-streaming, and a device, the functional component loading method for video live-streaming includes: an audience terminal receives video data corresponding to a live-streaming room accessed by the audience terminal, where the video data is generated by an anchor terminal corresponding to the live-streaming room; the audience terminal loads a functional component corresponding to a function identification if the video data contains the function identification, where the function identification indicates an enabled function of the anchor terminal.

18 Claims, 5 Drawing Sheets

Receiving video data corresponding to a live-streaming room accessed by the audience terminal, where the video data is generated by an anchor terminal corresponding to the live-streaming room — S101

Loading a functional component corresponding to a function identification if the video data contains the function identification, where the function identification indicates an enabled function of the anchor terminal — S102

(51) Int. Cl.
  *H04N 21/262* (2011.01)
  *H04N 21/442* (2011.01)
  *H04N 21/472* (2011.01)
  *H04N 21/63* (2011.01)
  *H04N 21/8355* (2011.01)

(56) References Cited

U.S. PATENT DOCUMENTS

2020/0067840 A1* 2/2020 Huang .................... H04L 47/56
2021/0099761 A1* 4/2021 Zhang .................. H04N 21/233

FOREIGN PATENT DOCUMENTS

| CN | 106604132 A | 4/2017 |
| CN | 106937158 A | 7/2017 |
| CN | 107124664 A | 9/2017 |
| CN | 107995155 A | 5/2018 |
| CN | 108462889 A | 8/2018 |
| CN | 109618176 A | 4/2019 |
| CN | 110415083 A | 11/2019 |
| CN | 110856008 A | 2/2020 |
| CN | 111405343 A | 7/2020 |
| CN | 111541930 A | 8/2020 |
| CN | 111901671 A | 11/2020 |
| JP | 2018029325 A | 2/2018 |
| WO | 2016078189 A1 | 5/2016 |

OTHER PUBLICATIONS

China National Intellectual Property Administration, Office Action and Search Report Issued in Application No. 202110040657.0, Nov. 8, 2022, 17 pages.
China National Intellectual Property Administration, Office Action and Search Report Issued in Application No. 202110040657.0, Apr. 27, 2023, 9 pages (submitted with English summary).

* cited by examiner

FUNCTIONAL COMPONENT LOADING METHOD AND DATA PROCESSING METHOD FOR VIDEO LIVE-STREAMING, AND DEVICE

CROSS-REFERENCE TO RELATED APPLICATIONS

This application is a national stage of International Application No. PCT/CN2022/070528, filed on Jan. 6, 2022, which claims priority to Chinese Patent Application No. 202110040657.0, filed on Jan. 13, 2021, both of which are hereby incorporated by reference in their entireties.

TECHNICAL FIELD

Embodiments of the present disclosure relate to the field of computer and network communication technology, and in particular, to a functional component loading method and data processing method for video live-streaming, and a device.

BACKGROUND

Video live-streaming refers to the way that anchors communicate with audiences through video. Anchors can turn on some functions in the process of communicating with audiences to realize the interaction between anchors and audiences or among audiences. For example, the anchor can turn on the duel function to enable a duel between the anchor and the audience. After the anchor starts a function, the terminal used by the audience needs to load the corresponding functional components of the function to implement the function.

In the related art, the loading method of functional components can include the following main steps: when a function is turned on by the anchor during the video live-streaming in the live-streaming room, the terminal device used by the anchor (hereinafter referred to as the anchor terminal) sends an enable notification message corresponding to the function to the server; after receiving the enable notification message, on the one hand, the server sends the enable notification message to the terminal device used by the audience (hereinafter referred to as the audience terminal) that has accessed the live-streaming room, so that the audience terminal that has accessed the live-streaming room loads the functional components of the function from the server; on the other hand, the function state of the function corresponding to the live-streaming room is recorded as the enabled state, so that the subsequent audience terminals accessing to the live-streaming room can load the functional components of the function from the server.

However, the above scheme has the problem that the audience cannot interact with the anchor using the function that the anchor has started.

SUMMARY

Embodiments of the present disclosure provide a functional component loading method and data processing method for video live-streaming, a device, a storage medium, a computer program product and a computer program, so as to overcome the existing problem that the audience cannot interact with the anchor using the function that has been enabled by the anchor.

In a first aspect, an embodiment of the present disclosure provides a functional component loading method for video live-streaming, which is applied to an audience terminal, including:
  receiving video data corresponding to a live-streaming room accessed by the audience terminal, where the video data is generated by an anchor terminal corresponding to the live-streaming room; and
  loading a functional component corresponding to a function identification if the video data contains the function identification, where the function identification indicates an enabled function of the anchor terminal.

In a second aspect, an embodiment of the present disclosure provides a data processing method for video live-streaming, applied to an anchor terminal, including:
  adding a function identification of an enabled function on the anchor terminal to generated video data; and
  sending the video data to an audience terminal accessed to a live-streaming room of the anchor terminal.

In a third aspect, an embodiment of the present disclosure provides an audience terminal, including:
  a video data receiving module, configured to receive the video data corresponding to a live-streaming room accessed by the audience terminal, where the video data is generated by an anchor terminal corresponding to the live-streaming room; and
  a functional component loading module, configured to load a functional component corresponding to the function identification if the video data contains the function identification, where the function identification indicates an enabled function of the anchor terminal.

In a fourth aspect, an embodiment of the present disclosure provides an anchor terminal, including:
  a function identification adding module, configured to add a function identification of an enabled function on the anchor terminal to generated video data; and
  a video data sending module, configured to send the video data to an audience terminal accessed to a live-streaming room of the anchor terminal.

In a fifth aspect, an embodiment of the present disclosure provides a functional component loading system for video live-streaming, including: an audience terminal and an anchor terminal; the audience terminal includes a video data receiving module and a functional component loading module; and the anchor terminal includes a function identification adding module and a video data sending module;
  the function identification adding module is configured to add a function identification of an enabled function on the anchor terminal to generated video data;
  the video data sending module is configured to send the video data to the audience terminal accessed to a live-streaming room of the anchor terminal;
  the video data receiving module is configured to receive video data corresponding to a live-streaming room accessed by the audience terminal; and
  the functional component loading module is configured to load a functional component corresponding to the function identification if the video data contains the function identification.

In a sixth aspect, an embodiment of the present disclosure provides an electronic device including: at least one processor and memory;
  the memory stores computer-executed instructions;
  the at least one processor executes the computer-executed instructions stored in the memory to enable the at least one processor to execute the method described above in the first aspect and the second aspect or various possible designs of the first aspect and the second aspect.

In a seventh aspect, an embodiment of the present disclosure provides a computer-readable memory medium in which the computer-readable memory medium stores the computer-executed instructions, and when the processor executes the computer-executed instructions, enables the computing device to execute the method described above in the first aspect and the second aspect or various possible designs of the first aspect and the second aspect.

In an eighth aspect, an embodiment of the present disclosure provides a computer program product, including a computer program, when the computer program is executed by a processor, the method described above in the first aspect and the second aspect or various possible designs of the first aspect and the second aspect is implemented.

In a ninth aspect, an embodiment of the present disclosure provides a computer program, the computer program is configured to implement the method described above in the first aspect and the second aspect or various possible designs of the first aspect and the second aspect.

BRIEF DESCRIPTION OF DRAWINGS

In order to more clearly illustrate the technical scheme in the embodiments of the present disclosure or in the related art, a brief description of the drawings required to be used in the embodiments or in the description of the related art is presented below. It is obvious that the drawings in the description below are embodiments of the present disclosure. For ordinary technical personnel in the field, other drawings can be obtained according to these drawings without any creative labor.

DESCRIPTION OF EMBODIMENTS

In order to make the purpose, technical scheme and advantages of the embodiments of the present disclosure clearer, the technical scheme in the embodiments of the present disclosure will be clearly and completely described in combination with the drawings attached to the embodiments of the present disclosure. Obviously, the described embodiment is a part of the disclosure embodiment, but not the whole embodiment. Based on the embodiments in the present disclosure, all other embodiments acquired by ordinary technical personnel in the field without creative labor are subject to the protection of the present disclosure.

Figure 1:
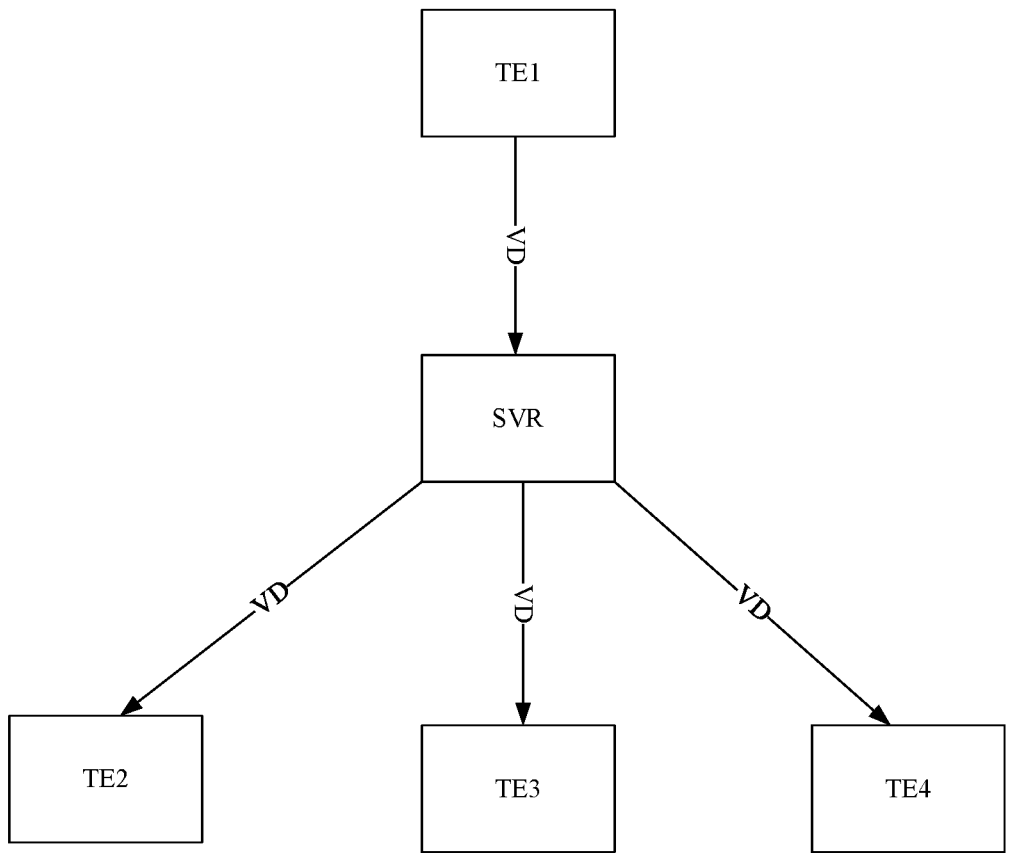
FIG. 1 is a schematic diagram of video data transmission in a video live-streaming scene provided by an embodiment of the present disclosure.

The embodiments of the present disclosure can be applied to a video live-streaming scenario. In the process of video live-streaming, one or more anchors communicate with one or more audiences by means of video. Each anchor uses one anchor terminal and each audience uses one audience terminal. During the live-streaming, the anchor creates a live-streaming room, and the audience terminal can access the room and interact with the anchor in the room. Referring to FIG. 1, a schematic diagram of video data transmission in a video live-streaming scenario is provided by example. FIG. 1 shows four terminal devices: TE1, TE2, TE3 and TE4, and a server SVR. TE1 is the anchor terminal, and TE2, TE3 and TE4 are the audience terminals corresponding to three audiences respectively. In the process of live-streaming, TE1 inputs the video data VD of the anchor and sends the VD to the SVR; the SVR sends the VD to TE2, TE3, and TE4 respectively. After receiving the VD sent by SVR, TE2, TE3, and TE4 parse and play the VD so that the audiences can see the anchor.

In the related art, the anchor can open a function during the video live-streaming. For example, the anchor can turn on the duel function on TEL After the anchor enables the duel function, TE1 sends an enable request message of the duel function to the SVR. After receiving the enable request message, on the one hand, the SVR sends an enable notification message of the duel function to TE2, TE3 and TE4 that have accessed the live-streaming room of the anchor, respectively, so that TE2, TE3 and TE4 can load the functional components of the duel function from the SVR after receiving the enable notification message; on the other hand, the SVR records the function state of the duel function corresponding to the live-streaming room as an enabled state, so that the terminal device TE5 newly accessed to the live-streaming room can load the functional component of the function whose function state is the enabled state from the SVR after it access to the live-streaming room. The functional component of the function whose function state is the enabled state includes the functional component of the duel function.

However, in the above scheme, when the server fails to send the enable notification message to the audience terminal, the audience terminal that has access the live-streaming room does not receive the enable notification message, and as a result, the audience terminal that has access the live-streaming room fails to load the functional component. However, the loading failure of the functional component resulted in that the audience could not interact with the anchor through the corresponding function.

In order to ensure that the accessed audience terminal can timely load the functional component of the function enabled by the anchor terminal, it is necessary to ensure that the accessed audience terminal can timely and accurately know the function enabled by the anchor terminal. In order to ensure that the accessed audience terminal can timely and accurately know the enabled function of the anchor terminal, the anchor terminal can superimposed another way to notify the audience terminal of the enabled function on the basis of the existing enable notification message. Thus, if the audience terminal that has accessed the live-streaming room does not receive the enable notification message, it can also obtain the enabled function of the anchor terminal through the method provided in an embodiment of the present disclosure to load the corresponding functional component.

In order to ensure the reliability of the method provided in an embodiment of the present disclosure, video data is used to carry the enabled function according to the following characteristics of the video live-streaming: in the first aspect, in the process of video live-streaming, the video data is continuously sent from the anchor terminal to the audience terminal, if the video data transmission fails, the video live-streaming stops, and the interaction between the anchor and the audience stops; in the second aspect, the video data in the video live-streaming will not be processed by other intermediate devices during transmission.

Based on this, embodiments of the present disclosure provide a functional component loading method and data processing method for video live-streaming, and a device. In the process of live-streaming, the anchor terminal sends the function identification of the enabled function to the audience terminal through the video data, so that the audience terminal can load the functional component. The embodiments of the present disclosure realize the synchronous transmission of the video data and the function identification, when the video live-streaming is not stopped, the video data is continuously sent to the audience terminal, so that the audience terminal can load the functional component through the function identification in the video data, improving the loading success rate of the functional component, and thus ensuring that the audience can interact with the anchor through the corresponding function.

The following are specific embodiments of the technical scheme of the disclosure embodiment and how the disclosure technical scheme solves the above technical problem in detail. The following specific embodiments may be combined with each other, and the same or similar concepts or processes may not be repeated in some embodiments. The disclosure embodiment is described below in conjunction with the attached drawings.

Figure 2:
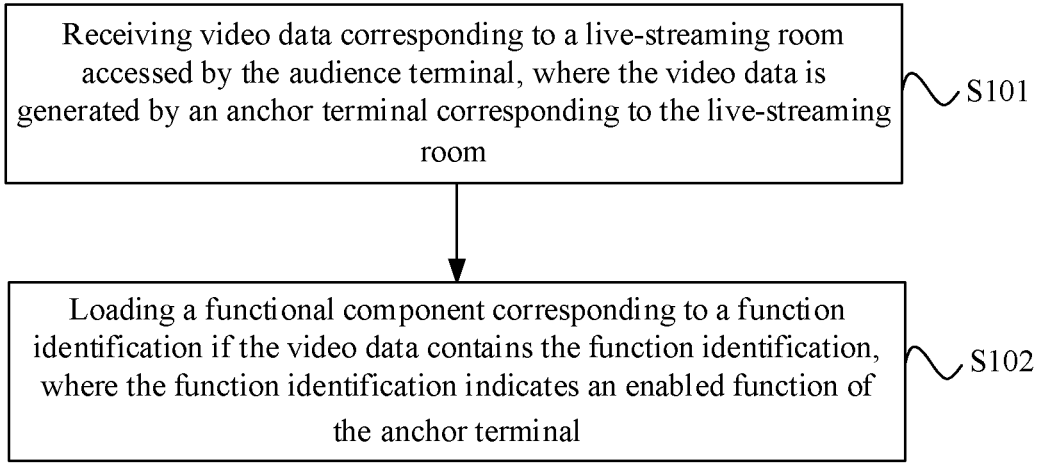
FIG. 2 is a step flow diagram of a functional component loading method for video live-streaming provided by an embodiment of the present disclosure.

Refer to FIG. 2, which is a step flow diagram of a functional component loading method for a video live-streaming provided by an embodiment of the present disclosure. The method shown in FIG. 2 can be applied to the audience terminal, which is a terminal device that receives video data. The functional component loading method for the video live-streaming includes:

S101: receiving video data corresponding to a live-streaming room accessed by the audience terminal, where the video data is generated by an anchor terminal corresponding to the live-streaming room.

The live-streaming room refers to a virtual room corresponding to the anchor, there is one or more anchors in a live-streaming room.

After the audience terminal accesses a live-streaming room, the audience terminal can receive the video data of one or more anchors in the live-streaming room. The video data is generated by the anchor terminal, and the anchor terminal sends it to the server as shown in FIG. 1. The server can extract the live-streaming room identity of the anchor terminal from the video data and obtain the audience terminal accessing to the live-streaming room according to the live-streaming room, to send the video data to the audience terminal.

S102: loading a functional component corresponding to a function identification if the video data contains the function identification, where the function identification indicates an enabled function of the anchor terminal.

The function identification is a unique identification of a function. The function identification can be added to the video data by an anchor terminal. After an anchor enables a function on the anchor terminal, the anchor terminal can add the function identification of the function to the video data which to be sent. The video data consists of multiple image frames, and the function identification may be located in each image frame or a specified image frame, and the function identification may be located at any location or a specified location in the image frame.

It should be noted that if there is no function identification in the video, it means that no function is enabled on the anchor terminal. In this case, no functional component needs to be loaded.

Optionally, in an example of an embodiment of the present disclosure, aforementioned S102 includes A:

A: loading the functional component corresponding to the function identification if a target image frame in the video data contains the function identification, the same time interval exists between any two adjacent target image frames.

The video data is acquired by the anchor terminal. The anchor terminal constantly acquires image frames and sends them to the audience terminal in real time as one of the frames in the video data, so that the image frames are continuously sent in the process of video live-streaming. If the anchor terminal transmits the function identification in every image frame, the transmission resources will be wasted. Thus, in an embodiment of the present disclosure, the anchor terminal adds the function identification to the image frame at a preset time interval, while the audience terminal loads the functional component corresponding to the function identification at a preset time interval. For example, if the anchor terminal adds the function identification to the image frame every 20 milliseconds, the audience terminal can extract the function identification from the received image frame every 20 milliseconds and load the functional component.

It should be understood that the function identification is added to the image frame every 20 milliseconds, so that the time interval between the image frames containing the function identification is 20 milliseconds. These image frames with a time interval of 20 milliseconds may be referred to as a target image frame in an embodiment of the present disclosure. Optionally, the target image frame can be a key frame.

The preset time interval can be set according to the actual application scenario and is not restricted in an embodiment of the present disclosure. It is understandable that the larger the preset time interval is, the larger the loading delay of the functional component will be; the smaller the preset interval is, the more frequently the load of functional component will be, which also causes greater pressure on the server.

Optionally, when the target image frame includes supplemental enhancement information (SEI), the function identification is contained in the supplemental enhancement information. The supplemental enhancement information can be understood as the control information of the image frame, which is used to control the synchronization between the image frame and the instant message. The supplemental enhancement information can be located in the head position of the image frame. The synchronization problem between the image frames and the instant message is caused by the following reasons: the instant message sending channel and the image frame sending channel are independent, and the delay of the instant message sending channel is small.

Optionally, in an example of an embodiment of the present disclosure, the loading the functional component corresponding to the function identification in S102 or A, includes B1 to B2:

B1: obtaining a function state of the function identification corresponding to the live-streaming room from a server; and B2: loading the functional component corresponding to the function identification if the function state is an enabled state, where the enabled state is recorded by the server after receiving an enable notification message, and the enable notification message is sent by the anchor terminal for the enabled function.

The function states of all functions can be recorded in the server and is the disabled state by default. When a function is enabled on the anchor terminal, the anchor terminal sends an enable request message of the function to the server. After receiving the enable request message, in the first aspect, the server sends the enable notification message to the audience terminal in the live-streaming room that has accessed the anchor terminal, so as to make the audience terminal load the functional component; in the second aspect, the server updates the function state of the function to the enabled state, so that the audience terminal that accesses the live-streaming room later loads the functional component; in the third aspect, the server sends an enable confirmation message to the anchor terminal to make the anchor terminal confirm that the function is enabled.

In an embodiment of the present disclosure, if the function state corresponding to the function identification is the disabled state, it indicates that the function of the anchor terminal fails to be enabled, and the function state on the server is not successfully updated to the enabled state. In this case, the functional component corresponding to the function identification is not loaded even if the video data contains the function identification.

The embodiment of the present disclosure can more accurately control the loading of the functional component through the function state in the server, avoiding the loading of the functional component when the server does not allow the live-streaming room to enable the function.

Optionally, in an example of an embodiment of the present disclosure, the loading the functional component corresponding to the function identification in B2, includes C:

C: loading the functional component corresponding to the function identification in a case that the functional component corresponding to the function identification is not loaded.

It can be understood that in an embodiment of the present disclosure, after the anchor requests a function to be enabled on the anchor terminal, the anchor terminal sends the enable request message of the function to the server; after receiving the enable request message, the server records the function state of the function corresponding to the live-streaming room of the anchor terminal as the enabled state, and sends the enable notification message to the audience terminals that have accessed the live-streaming room. However, at least one of the audience terminals has not received the enable notification message, so the at least one of the audience terminals has not loaded the functional component. Thereafter, the at least one audience terminal receives the video data of the anchor terminal, the video data contains the function identification, so that the at least one audience terminal can load the functional component corresponding to the function identification. Thus, the embodiment of the present disclosure improves the loading success rate of the audience terminal for loading functional components.

The embodiment of the present disclosure can load the functional component when it is not loaded, which can not only improve the success rate of loading of the functional component, but also avoid the waste of audience terminal resources caused by repeated loading of the functional component.

Optionally, in an example of an embodiment of the present disclosure, the loading the functional component corresponding to the function identification in C, includes D1 to D2.

D1: obtaining the function state of the function identification corresponding to the live-streaming room from the server if the number of times for obtaining the function state of the function identification corresponding to the live-streaming room from the server is less than the preset maximum number of times.

The preset maximum number of times can be set according to the actual application scenario, which is not restricted in an embodiment of the present disclosure. For example, the preset maximum number of times can be set to 3.

In an embodiment of the present disclosure, the functional component is loaded when the functional component corresponding to the function identification is not loaded, so that the loading of the functional component this time represents the failure to load the functional component last time. In this way, the loading of the functional component can be attempted several times when the functional component is not loaded. The embodiment of the present disclosure allows obtaining the preset maximum number of times of the function state of the functional component from the server. If the preset maximum number of times is exceeded, it means that the functional component is abnormal and cannot be loaded successfully. If the functional component is normal, the functional component is loaded once.

D2: updating the number of times for obtaining the function state of the function identification corresponding to the live-streaming room from the server.

Specifically, the number of times for obtaining the function state corresponding to the function identification can be increased by 1, which can be set as 0 initially, so that each time it is obtained will be increased by 1 until the number is the preset maximum number.

The embodiment of the present disclosure can limit the continuous loading of abnormal functional components by the preset maximum number of times, thus reducing the pressure on the server caused by obtaining the function state of the functional component from the server.

Optionally, in one example of an embodiment of the present disclosure, the above method further includes D3 based on D1 and D2 above:

D3: sending abnormal state information to the server if the number of times for obtaining the function state of the function identification corresponding to the live-streaming room from the server is greater than or equal to the preset maximum number of times, where the abnormal state information includes the function identification, and the abnormal state information is used to indicate that a function corresponding to the function identification is in an abnormal state.

It is understandable that when the number of times for obtaining the function state of the function identification from the server is greater than or equal to the preset maximum number of times, it indicates that the functional component has failed to be loaded for many times before. In this case, to reduce the pressure on the server, the function state of the function identification is not obtained from the server any more, and the functional component is not loaded any more.

In addition, the audience terminal can send abnormal state information to the server. After the server receives the abnormal state information, on the one hand, it can prompt the abnormal state information to the developer, so that the developer can repair the functional component, on the other hand, the number of pieces of the abnormal state information corresponding to the same function identification can be counted, if the number is greater than or equal to the preset number of times, the function state corresponding to the function identification cannot be changed to the enabled state and the abnormal state information can be returned to the anchor terminal when receiving the enable notification message of this function identification from the anchor terminal. Upon receiving the abnormal state information, the anchor terminal can prompt a message indicating that the function is abnormal when the anchor enables the function.

To sum up, the functional component loading method of for video live-streaming provided in this embodiment includes: receiving video data corresponding to a live-streaming room accessed by the audience terminal, where the video data is generated by an anchor terminal corresponding to the live-streaming room; if the video data contains a function identification, loading the functional component corresponding to the function identification, where the function identification indicates an enabled function of the anchor terminal. The embodiments of the present disclosure realize the synchronous transmission of video data and function identification, when the video live-streaming is not stopped, the video data is continuously sent to the audience terminal, so that the audience terminal can load the functional component through the function identification in the video data, improving the loading success rate of the functional component, and thus ensuring that the audience can interact with the anchor through the corresponding function.

Figure 3:
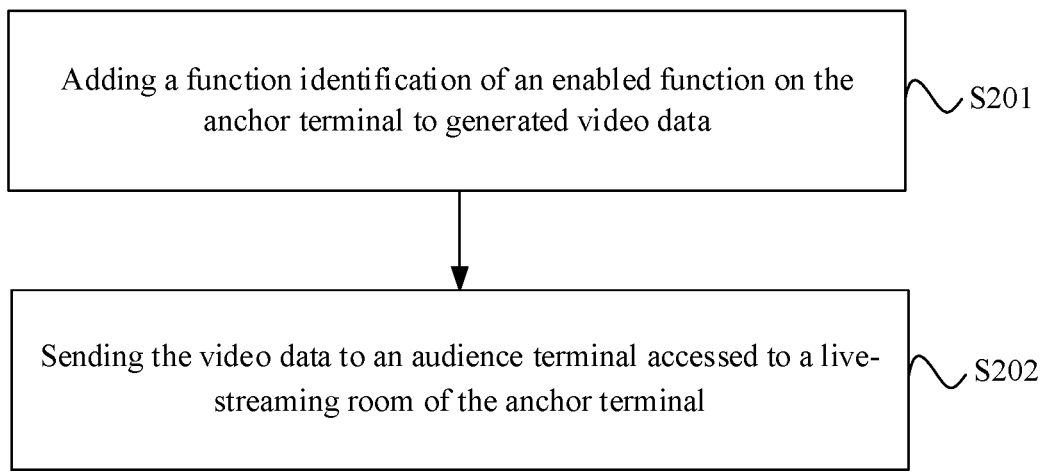
FIG. 3 is a step flow diagram of a data processing method for video live-streaming provided by an embodiment of the present disclosure.

Refer to FIG. 3, which is a step flow diagram of a data processing method for video live-streaming provided by an embodiment of the present disclosure. The method shown in FIG. 3 can be applied to the anchor terminal, which is a terminal device for sending video data. The data processing method for the video live-streaming includes: S201 and S202.

S201: adding a function identification of an enabled function on the anchor terminal to generated video data.

In practical application, the user can request to turn on a function in the live-streaming interface of the anchor terminal by operating the function control. Users can request to turn on a function during the live-streaming or at the beginning of the live-streaming. After receiving the enable confirmation message of the function from the server, the anchor terminal can record the enabled function. In this way, the anchor terminal can add the function identification of the enabled function to the generated video data.

The video data includes several image frames, and the function identification can be located in any image frame or a specified image frame, and the function identification can be located in any position or a specified position in the image frame.

Optionally, the function identification can be located in at least two target image frames in the video data, and the same time interval exists between any two adjacent target image frames.

Optionally, the target image frame includes supplemental enhancement information and the function identification is contained in the supplemental enhancement information.

Optionally, the function identification of the enabled function on the anchor terminal is recorded by the anchor terminal after receiving an enable confirmation message, and the enable confirmation message is sent by a server after receiving an enable request message of a function from the anchor terminal.

In an embodiment of the present disclosure, when the anchor turns on a function on the anchor terminal, the anchor terminal sends an enable request message to the server; after receiving the enable request message, in the first aspect, the server changes the function state of the anchor's live-streaming room to the enabled state in the server; in the second aspect, the server sends the enable notification message to the audience terminal that has accessed the live-streaming room; in the third aspect, the server sends the enable confirmation message to the anchor terminal. After receiving the confirmation message, the anchor terminal records the function identification of the function, indicating that the function is enabled.

S202: sending the video data to an audience terminal accessed to a live-streaming room of the anchor terminal.

Specifically, the video data can be sent to the audience terminal through the server, that is, the anchor terminal sends the video data to the server, and the server obtains one or more audience terminals that access the live-streaming room according to the live-streaming room identification in the video data, so as to forward the video data to the one or more audience terminals.

To sum up, the data processing method of video live-streaming provided in this embodiment includes: adding the function identification of the enabled function on the anchor terminal to the generated video data; sending the video data to the audience terminal accessed to the live-streaming room of the anchor terminal. The embodiment of the present disclosure can send the function identification of the enabled functional component to the audience terminal through video data so that the audience terminal can load the functional component. Since the video data is continuously sent from the anchor terminal to the audience terminal, multiple loads of functional components are realized, which improves the loading success rate and helps ensure the audience to interact with the anchor through the corresponding function.

Figure 4:
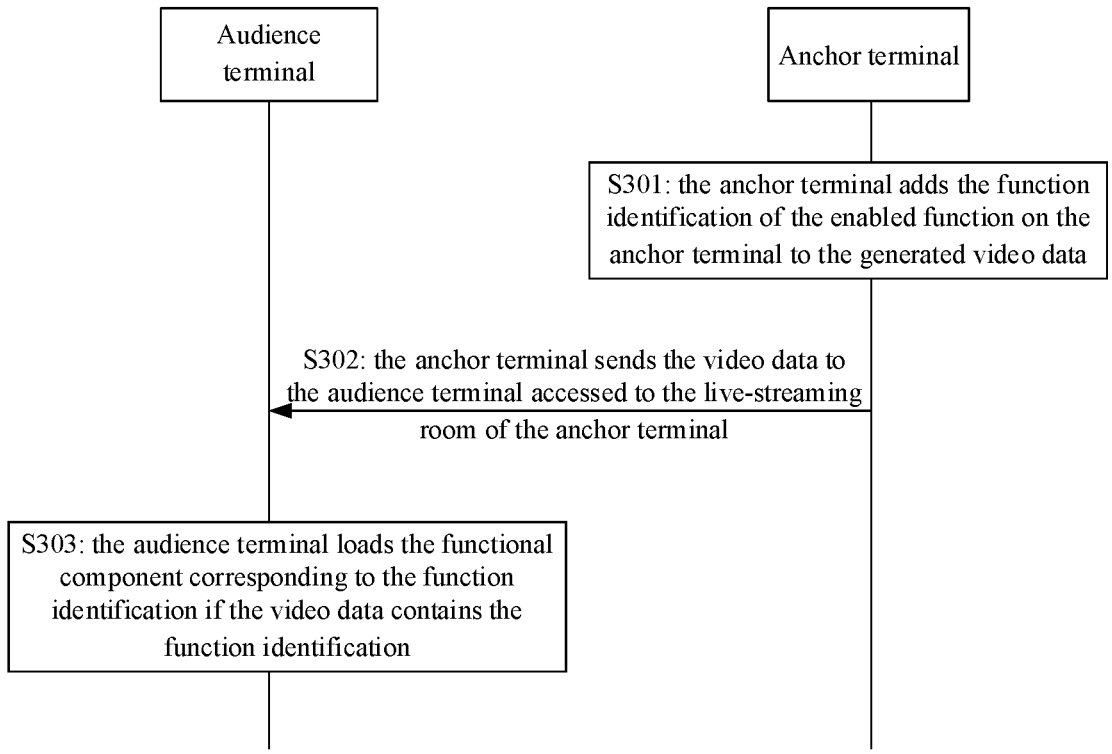
FIG. 4 is a diagram of an interaction process between an audience terminal and an anchor terminal provided by an embodiment of the present disclosure.

The method shown in FIG. 2 and FIG. 3 above can constitute the interaction process between the audience terminal and the anchor terminal. Specifically, refer to FIG. 4, which can include S301 to S303.

S301: the anchor terminal adds the function identification of the enabled function on the anchor terminal to the generated video data.

S302: the anchor terminal sends the video data to the audience terminal accessed to the live-streaming room of the anchor terminal.

S303: the audience terminal loads the functional component corresponding to the function identification if the video data contains the function identification.

The detailed description of the steps in the above interaction process can refer to the corresponding steps in FIG. 2 or FIG. 3 and will not be repeated here.

Figure 5:
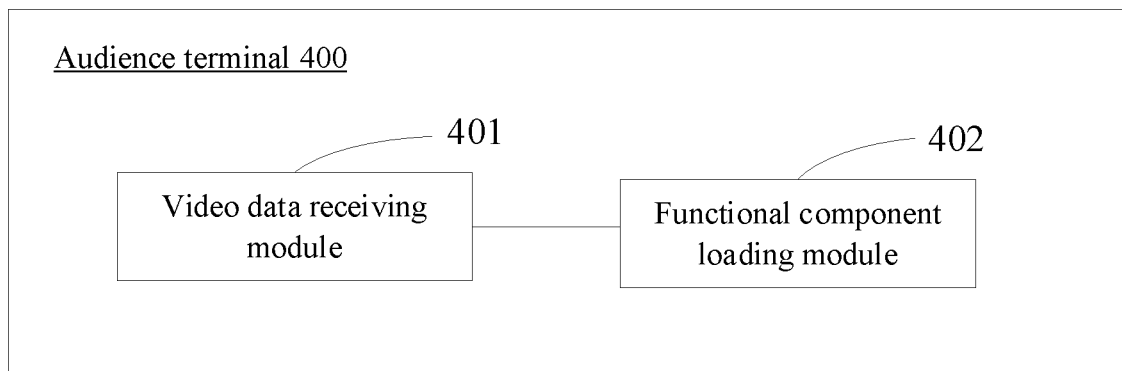
FIG. 5 is a structural block diagram of an audience terminal provided by an embodiment of the present disclosure.

For the functional component loading method for video live-streaming corresponding to the above embodiment, FIG. 5 shows a structural block diagram of an audience terminal provided by an embodiment of the present disclosure. For illustrative purposes only the parts relevant to the embodiments of the present disclosure are shown. With reference to FIG. 5, the audience terminal 400 includes a video data receiving module 401 and a functional component loading module 402.

The video data receiving module 401 is configured to receive the video data corresponding to the live-streaming room accessed by the audience terminal, where the video data is generated by the anchor terminal corresponding to the live-streaming room.

The functional component loading module 402 is configured to load the functional component corresponding to the function identification if the video data contains a function identification, where the function identification indicates the enabled function of the anchor terminal.

Optionally, in an example of an embodiment of the present disclosure, the functional component loading module 402 is further configured to:

load the functional component corresponding to the function identification if a target image frame in the video data contains the function identification, where the same time interval exists between any two adjacent target image frames.

Optionally, in an example of an embodiment of the present disclosure, the functional component loading module 402 is further configured to:

obtain a function state of the function identification corresponding to the live-streaming room from a server; and load the functional component corresponding to the function identification if the function state is an enabled state. The enabled state is recorded by the server after receiving an enable notification message, and the enable notification message is sent by the anchor terminal for the enabled function.

Optionally, in an example of an embodiment of the present disclosure, the functional component loading module 402 is further configured to: load the functional component corresponding to the function identification in a case that the functional component corresponding to the function identification is not loaded.

Optionally, in an example of an embodiment of the present disclosure, the above functional component loading module 402 is further configured to:

obtain the function state of the function identification corresponding to the live-streaming room from the server if a number of times for obtaining the function state of the function identification corresponding to the live-streaming room from the server is less than a preset maximum number of times; and update the number of times for obtaining the function state of the function identification corresponding to the live-streaming room from the server.

Optionally, in an example of an embodiment of the present disclosure, the audience terminal further includes:

an abnormal prompt module, configured to send abnormal state information to the server if the number of times for obtaining the function state of the function identification corresponding to the live-streaming room from the server is greater than or equal to the preset maximum number of times, where the abnormal state information includes the function identification, and the abnormal state information is used to indicate that the function corresponding to a function identification is in an abnormal state.

Optionally, in an example of an embodiment of the present disclosure, the target image frame includes supplemental enhancement information and the function identification is contained in the supplemental enhancement information.

The audience terminal provided by this embodiment can be used to execute the technical scheme of the method embodiment shown in FIG. 2 above. The implementation principles and the technical effects therebetween are similar, so this embodiment will not be repeated here.

Figure 6:
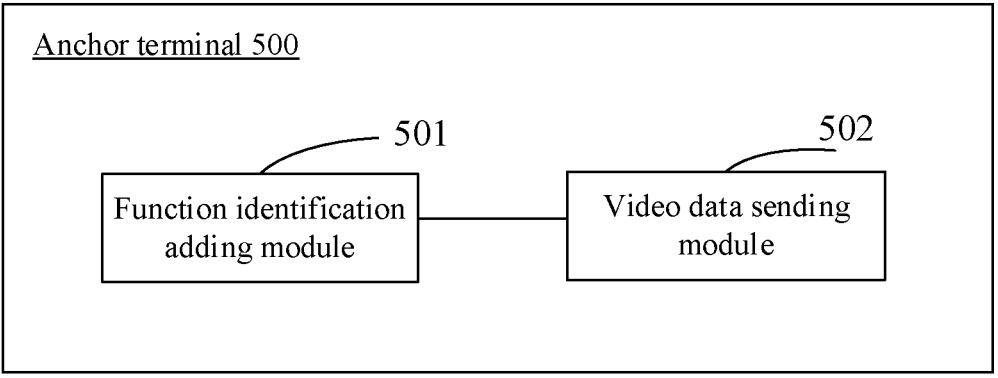
FIG. 6 is a structural block diagram of an anchor terminal provided by an embodiment of the present disclosure.

Corresponding to the data processing method for video live-streaming in the above embodiment, FIG. 6 shows a structural block diagram of an anchor terminal provided by an embodiment of the present disclosure. For illustrative purposes only the parts relevant to the embodiments of the present disclosure are shown. According to FIG. 6, the anchor terminal 500 includes a function identification adding module 501 and a video data sending module 502.

The function identification adding module 501 is configured to add a function identification of an enabled function on the anchor terminal to generated video data.

The video data sending module 502 is configured to send the video data to an audience terminal accessed to a live-streaming room of the anchor terminal.

Optionally, in an example of an embodiment of the present disclosure, the function identification is located in at least two target image frames in the video data, and the same time interval exists between any two adjacent target image frames.

Optionally, in an example of an embodiment of the present disclosure, the target image frame includes supplemental enhancement information and the function identification is contained in the supplemental enhancement information.

Optionally, in one example of an embodiment of the present disclosure, the function identification of the enabled function on the anchor terminal is recorded by the anchor terminal after receiving an enable confirmation message, and the enable confirmation message is sent by a server after receiving an enable request message of a function from the anchor terminal.

The anchor terminal provided by this embodiment can be used to execute the technical scheme of the method embodiment shown in FIG. 3 above. The implementation principles and the technical effects therebetween are similar, so this embodiment will not be repeated here.

Figure 7:
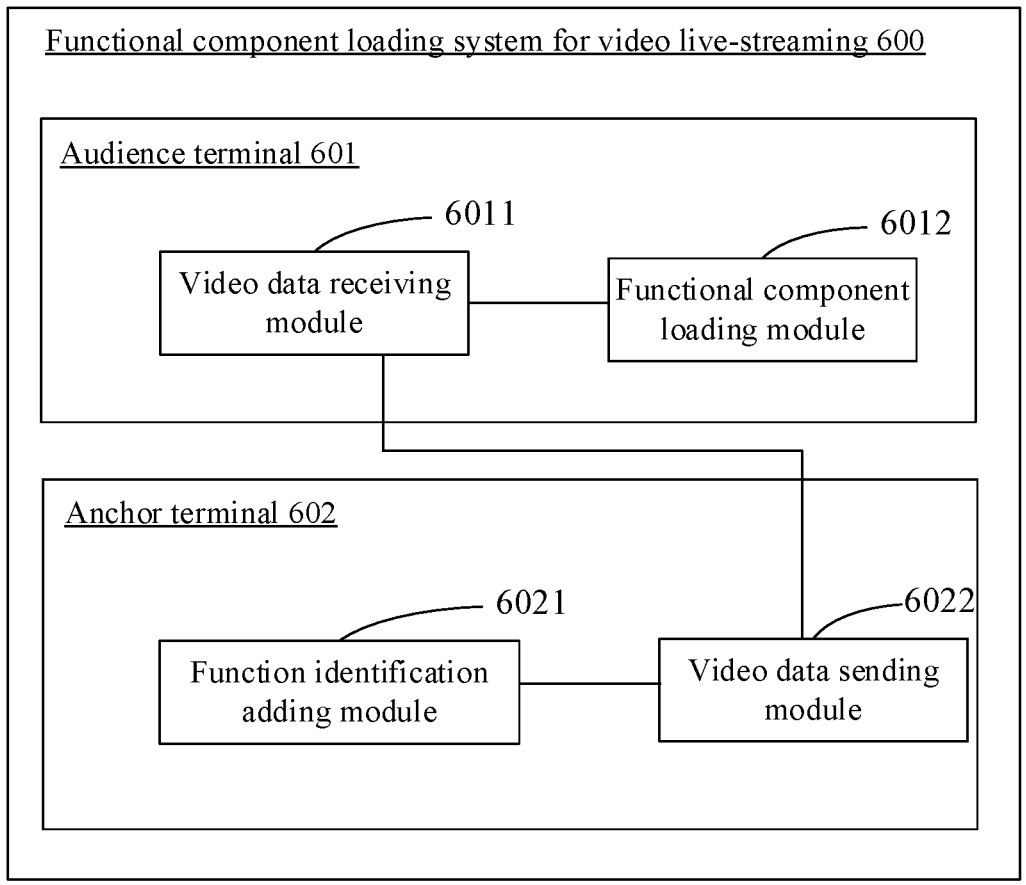
FIG. 7 is a structural block diagram of a functional component loading system for video live-streaming provided by an embodiment of the present disclosure.

Refer to FIG. 7, which is a structural block diagram of a functional component loading system 600 for video live-streaming provided by an embodiment of the present disclosure. The system includes one or more audience terminals 601 and one or more anchor terminals 602; the audience terminal 601 includes a video data receiving module 6011 and a functional component loading module 6012; the anchor terminal 602 includes a function identification adding module 6021 and a video data sending module 6022.

The function identification adding module 6021 is configured to add a function identification of an enabled function on the anchor terminal 602 to generated video data.

The video data sending module 6022 is configured to send the video data to the audience terminal 601 accessed to a live-streaming room of the anchor terminal 602.

The video data receiving module 6011 is configured to receive video data corresponding to a live-streaming room accessed by the audience terminal 601.

The functional component loading module 6012 is configured to load a functional component corresponding to a function identification if the video data contains the function identification.

The functional component loading system for video live-streaming provided by this embodiment can be used to execute the technical scheme of the method embodiments shown in FIG. 2 and FIG. 3 above. The implementation principles and the technical effects therebetween are similar, so this embodiment will not be repeated here.

Figure 8:
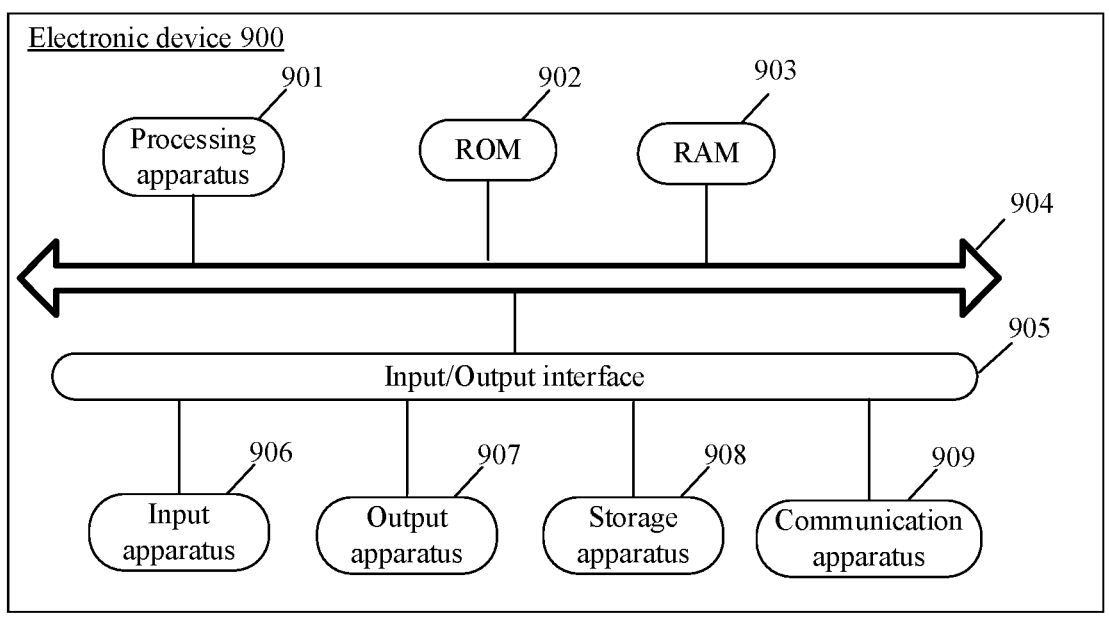
FIG. 8 is a hardware structure diagram of an electronic device provided by an embodiment of the present disclosure.

The audience terminal and the anchor terminal in an embodiment of the present disclosure are both electronic devices. Refer to FIG. 8, which shows a structure diagram of an electronic device 900 suitable for implementing an embodiment of the present disclosure, which may be a terminal device. The terminal device may include, but are not limited to, a mobile phone, a laptop computer, a digital broadcast receiver, a personal digital assistant (PDA), a portable android device (PAD), a portable media player (PMP), an on-board terminal (such as an on-board navigation terminal) and a fixed terminal such as a digital TV, a desktop computer and so on. The electronic device shown in FIG. 8 is merely an example and should not impose any limitations on the function and scope of use of the embodiments of the present disclosure.

As shown in FIG. 8, an electronic device 900 can include a processing apparatus (e.g. a central processing unit, a graphics processor, etc.) 901, which can perform various appropriate actions and processes depending on programs stored in a read only memory (ROM) 902 or loaded into a random access memory (RAM) 903 from storage apparatus 908. RAM 903 also stores various programs and data required for the operation of the electronic device 900. The processing apparatus 901, the ROM 902, and the RAM 903 are connected to each other through a bus 904. An input/output (I/O) interface 905 is also connected to the bus 904.

Generally, the following apparatus can be connected to the I/O interface 905: including: input apparatus 906 such as touch screen, touchpad, keyboard, mouse, camera, microphone, accelerometer, gyroscope, etc.; an output device 907 such as a liquid crystal display (LCD), loudspeaker, vibrator, etc.; a storage apparatus 908 such as magnetic tape, hard disk, etc.; and the communication apparatus 909. The communication apparatus 909 allows the electronic device 900 to communicate wirelessly or wired with other devices to exchange data. Although FIG. 8 shows an electronic device 900 with various apparatus, it should be understood that it is not required to implement or have all of the devices shown. May be implemented or have more or fewer devices instead.

The functional component loading method and data processing method for video live-streaming, and the device provided in this embodiment is applied to an audience terminal. The methods include: receiving video data corresponding to a live-streaming room accessed by the aforementioned audience terminal, where the aforementioned video data is generated by an anchor terminal corresponding to the aforementioned live-streaming room; if the aforementioned video data contains a function identification, loading the functional components corresponding to the aforementioned function identification, where the aforementioned function identification is used to indicate the enabled function of the aforementioned anchor terminal. The embodiments of the present disclosure realize the synchronous transmission of the video data and the function identification, when the video live-streaming is not stopped, the video data is continuously sent to the audience terminal, so that the audience terminal can load the functional component through the function identification in the video data, improving the loading success rate of the functional component, and thus ensuring that the audience can interact with the anchor through the corresponding function.

In particular, the process described in the reference flow diagram above may be implemented as a computer software program in accordance with an embodiment of the present disclosure. For example, an embodiment of the present disclosure includes a computer program product that includes a computer program hosted on a computer readable medium, the computer program contains program code for performing the method shown in the flow diagram. In such an embodiment, the computer program can be downloaded and installed from the network via the communication apparatus 909, or from the storage apparatus 908, or the ROM 902. When the computer program is executed by the processing apparatus 901, the functions defined in the method of the embodiment of the present disclosure are performed.

It should be noted that the computer readable medium mentioned in the present disclosure may be a computer readable signal medium or a computer readable storage medium or any combination of the two. Computer readable storage medium may, for example, be, but are not limited to, electrical, magnetic, optical, electromagnetic, infrared, or semiconductor systems, equipment or devices, or any combination of the above. More specific examples of computer readable storage medium may include, but are not limited to: electrical connection with one or more wires, a portable computer disk, a hard disk, a random access memory (RAM), a read only memory (ROM), an erasable programmable read-only memory (EPROM or flash memory), a fiber optic, a portable compact disk read-only memory (CD-ROM), an optical storage device, a magnetic storage device, or any suitable combination of the foregoing. In the present disclosure, a computer readable storage medium may be any tangible medium containing or storing a program, the program may be used by or in combination with an instruction execution system, equipment or device. In the present disclosure, a computer readable signal medium may include a data signal propagated in baseband or as part of a carrier that carries computer readable program code. Such transmitted data signals may take many forms, including but not limited to electromagnetic signals, optical signals, or any suitable combination of the above. The computer-readable signal medium may also be any computer-readable medium other than the computer-readable storage medium which may send, propagate or transmit a program used by or in combination with an instruction execution system, equipment or device. The program code contained on the computer readable medium may be transmitted in any appropriate medium, including but not limited to: wire, optical cable, radio frequency (RF), etc., or any suitable combination of the above.

The computer readable medium may be included in the electronic equipment; or it may exist alone and not be incorporated into the electronic device.

The computer readable medium carries one or more programs which, when executed by the electronic device, enables the electronic device to perform the method shown in the embodiment.

Computer program code used to perform operations of the disclosure can be written in one or more programming languages, or combinations of them, the programming languages include object-oriented programming languages such as Java, Smalltalk, C++, as well as regular procedural programming languages such as the "C" language or similar programming languages. Program code may execute completely on the user's computer, partly on the user's computer, as a stand-alone package, partly on the user's computer and partly on a remote computer, or completely on a remote computer or server. In the case of a remote computer, the remote computer may connect to the user computer through any kind of Network, including a local area network (LAN) or a wide area network (WAN), or, connect to an external computer (for example, using an Internet service provider to connect over the Internet).

The flow diagrams and block diagrams in the attached drawings illustrate the possible realization of the architecture, functions and operations of the systems, methods and computer program products in accordance with the various embodiments of the present disclosure. At this point, each block in a flow diagram or block diagram may represent a module, program segment, or part of code that contains one or more executable instructions to implement a specified logical function. It should also be noted that in some alternative implementations, the functions labeled in the block can also occur in a different order than those labeled in the attached drawings. For example, two blocks represented back-to-back can actually be executed mostly in parallel, and they can sometimes be executed in reverse order, depending on the functionality involved. Note also that each block in the block diagram and/or flow diagram, and the combination of blocks in the block diagram and/or flow diagram, can be implemented either with a dedicated hardware-based system that performs a specified function or operation, or with a combination of dedicated hardware and computer instructions.

The units described in an embodiment of the present disclosure may be implemented by means of software or hardware. In some cases, the name of the unit does not qualify the unit itself. For example, the first acquisition unit can also be described as "the unit that acquires at least two Internet protocol addresses".

The functions described above in this article can be performed at least in part by one or more hardware logical parts. For example, unrestrictedly, demonstration types of hardware logic parts that can be used include: a field-programmable gate array (FPGA), an application specific integrated circuit (ASIC), an application specific standard product (ASSP), a system on chip (SOC), a complex programmable logic device (CPLD) and so on.

In the context of the present disclosure, a machine readable medium may be a tangible medium that may contain or store a program for use by or in combination with an instruction execution system, apparatus, or device. The machine readable medium may be a machine readable signal medium or a machine readable storage medium. The machine readable storage media may include, but is not limited to an electrical, magnetic, optical, electromagnetic, infrared, or semiconductor system, apparatus, or device, or any suitable combination of the foregoing. More specific examples of the machine readable storage medium may include an electrical connection with one or more wires, a portable computer disk, a hard disk, a random access memory (RAM), a read only memory (ROM), an erasable programmable read-only memory (EPROM or a flash memory), a fiber optic, a portable compact disk read-only memory (CD-ROM), an optical storage device, a magnetic storage device, or any suitable combination of the foregoing.

In a first example of a first aspect, an embodiment of the present disclosure provides a functional component loading method for video live-streaming, applied to an audience terminal, including:
  receiving video data corresponding to a live-streaming room accessed by the audience terminal, where the video data is generated by an anchor terminal corresponding to the live-streaming room; and
  loading a functional component corresponding to a function identification if the video data contains the function identification, where the function identification indicates an enabled function of the anchor terminal.

Based on the first example of the first aspect, in a second example of the first aspect, the loading the functional component corresponding to the function identification if the video data contains the function identification includes:
  loading the functional component corresponding to the function identification if a target image frame in the video data contains the function identification, where a same time interval exists between any two adjacent target image frames.

Based on the first example or the second example of the first aspect above, in a third example of the first aspect, when the functional component corresponding to the function identification is loaded, the loading the functional component corresponding to the function identification includes:
  obtaining a function state of the function identification corresponding to the live-streaming room from a server; and
  loading the functional component corresponding to the function identification if the function state is an enabled state, where the enabled state is recorded by the server after receiving an enable notification message, and the enable notification message is sent by the anchor terminal for the enabled function.

Based on the third example of the first aspect above, in a fourth example of the first aspect, the loading the functional component corresponding to the function identification includes:
  loading the functional component corresponding to the function identification in a case that the functional component corresponding to the function identification is not loaded.

Based on the fourth example of the first aspect above, in a fifth example of the first aspect, the obtaining the function state of the function identification corresponding to the live-streaming room from the server includes:
  obtaining the function state of the function identification corresponding to the live-streaming room from the server if a number of times for obtaining the function state of the function identification corresponding to the live-streaming room from the server is less than a preset maximum number of times; and
  updating the number for obtaining the function state of the function identification corresponding to the live-streaming room from the server.

Based on the fifth example of the first aspect above, in a sixth example of the first aspect, the method further includes:
  sending abnormal state information to the server if the number for times of obtaining the function state of the function identification corresponding to the live-streaming room from the server is greater than or equal to the preset maximum number of times, where the abnormal state information includes the function identification, and the abnormal state information is used to indicate that a function corresponding to the function identification is in an abnormal state.

Based on the second example of the first aspect above, in a seventh example of the first aspect, the target image frame includes supplemental enhancement information and the function identification is contained in the supplemental enhancement information.

In a first example of a second aspect, providing a data processing method for video live-streaming, applied to an anchor terminal, including:
  adding a function identification of an enabled function on the anchor terminal to generated video data; and
  sending the video data to an audience terminal accessed to a live-streaming room of the anchor terminal.

Based on the first example of the second aspect, in a second example of the second aspect, the function identification is located in at least two target image frames in the video data, and a same time interval exists between any two adjacent target image frames.

Based on the second example of the second aspect, in a third example of the second aspect, the target image frame includes supplemental enhancement information and the function identification is contained in the supplemental enhancement information.

Based on the second example of the second aspect, in a fourth example of the second aspect, the function identification of the enabled function on the anchor terminal is recorded by the anchor terminal after receiving an enable confirmation message, and the enable confirmation message is sent by a server after receiving an enable request message of a function from the anchor terminal.

In a first example of a third aspect, an audience terminal is provided, including:
- a video data receiving module, configured to receive video data corresponding to a live-streaming room accessed by the audience terminal, where the video data is generated by an anchor terminal corresponding to the live-streaming room; and
- a functional component loading module, configured to load a functional component corresponding to a function identification if the video data contains the function identification, where the function identification indicates an enabled function of the anchor terminal.

Based on the first example of the third aspect above, in a second example of the third aspect, the functional component loading module is further configured to load the functional component corresponding to the function identification if a target image frame in the video data contains the function identification, where the same time interval exists between any two adjacent target image frames.

Based on the first example or the second example of the third aspect above, in a third example of the third aspect, the functional component loading module is further configured to obtain a function state of the function identification corresponding to the live-streaming room from a server; and
  load the functional component corresponding to the function identification if the function state is an enabled state. The enabled state is recorded by the server after receiving an enable notification message, and the enable notification message is sent by the anchor terminal for the enabled function.

Based on the third example of the third aspect above, in a fourth example of the third aspect, the functional component loading module is further configured to load the functional component corresponding to the function identification in a case that the functional component corresponding to the function identification is not loaded.

Based on the fourth example of the third aspect above, in a fifth example of the third aspect, the functional component loading module is further configured to:
- obtain the function state of the function identification corresponding to the live-streaming room from the server if a number of times for obtaining the function state of the function identification corresponding to the live-streaming room from the server is less than a preset maximum number of times;
- update the number of times for obtaining the function state of the function identification corresponding to the live-streaming room from the server.

Based on the fifth example of the third aspect above, in a sixth example of the third aspect, the device is further includes:
- an abnormal prompt module, configured to send the abnormal state information to the server if the number of times for obtaining the function state of the function identification corresponding to the live-streaming room from the server is greater than or equal to the preset maximum number of times, where the abnormal state information includes the function identification, and the abnormal state information is used to indicate that the function corresponding to a function identification is in an abnormal state.

Based on the second example of the third aspect above, in a seventh example of the third aspect, the target image frame includes supplemental enhancement information and the function identification is contained in the supplemental enhancement information.

In a first example of a fourth aspect, an anchor terminal is provided, including:
- a function identification adding module, configured to add a function identification of an enabled function on the anchor terminal to generated video data; and
- a video data sending module, configured to send the video data to an audience terminal accessed to a live-streaming room of the anchor terminal.

Based on the first example of the fourth aspect, in a second example of the fourth aspect, the function identification is located in at least two target image frames in the video data, and the same time interval exists between any two adjacent target image frames.

Based on the second example of the fourth aspect, in a third example of the fourth aspect, the target image frame includes supplemental enhancement information and the function identification is contained in the supplemental enhancement information.

Based on any of the first to third examples of the fourth aspect, in a fourth example of the fourth aspect, the function identification of the enabled function on the anchor terminal is recorded by the anchor terminal after receiving an enable confirmation message, and the enable confirmation message is sent by a server after receiving an enable request message of a function from the anchor terminal.

In a fifth aspect, according to one or more embodiments of the present disclosure, a functional component loading system for video live-streaming is provided, including: an audience terminal and an anchor terminal, where the audience terminal includes a video data receiving module and a functional component loading module; and the anchor terminal includes a function identification adding module and a video data sending module;
- the function identification adding module is configured to add a function identification of an enabled function on the anchor terminal to generated video data;
- the video data sending module is configured to send the video data to the audience terminal accessed to a live-streaming room of the anchor terminal;
- the video data receiving module is configured to receive video data corresponding to a live-streaming room accessed by the audience terminal; and
- the functional component loading module is configured to load a functional component corresponding to a function identification if the video data contains the function identification.

In a sixth aspect, according to one or more embodiments of the present disclosure, an electronic device is provided, including: at least one processor and memory;
- the memory stores computer-executed instructions;
- the at least one processor executes the computer-executed instructions stored in the memory to enable the at least one processor to execute the method described above in the first aspect and the second aspect or various possible designs of the first aspect and the second aspect.

In a seventh aspect, according to one or more embodiments of the present disclosure, providing a computer-readable memory medium in which the computer-readable memory medium stores the computer-executed instructions, and when the processor executes the computer-executed instructions, the method described above in the first aspect and the second aspect or various possible designs of the first aspect and the second aspect is implemented.

In an eighth aspect, according to one or more embodiments of the present disclosure, providing a computer program product, including a computer program, when the computer program is executed by a processor, the method described above in the first aspect and the second aspect or various possible designs of the first aspect and the second aspect is implemented.

In a ninth aspect, according to one or more embodiments of the present disclosure, providing a computer program, the computer program is used to implement the method described above in the first aspect and the second aspect or various possible designs of the first aspect and the second aspect.

The above description is only a better published embodiment and an explanation of the technical principles used. The person skilled in the field shall understand that the scope of disclosure covered by the present disclosure shall not be limited to technical schemes resulting from a particular combination of such technical characteristics, but shall also cover other technical schemes resulting from any combination of such technical characteristics or their equivalent without being isolated from such disclosure ideas. For example, a technical scheme formed by substituting the above features with the similar functional technical features disclosed in the present disclosure (without limitation).

Furthermore, although operations are described in a particular order, this should not be understood as requiring that they be performed in the particular order indicated or in a sequential order. In certain circumstances, multitasking and parallel processing can be beneficial. Similarly, although a number of concrete implementation details are included in the above discussion, these should not be interpreted as limiting the scope of the present disclosure. Some of the characteristics described in the context of a single embodiment can also be realized in combination in a single embodiment. Conversely, various characteristics described in the context of a single embodiment can also be realized in multiple embodiments individually or in any suitable sub-combination.

Although the subject has been described in language specific to structural features and/or methodological logical actions, it should be understood that the subject defined in the attached claims is not necessarily limited to the specific features or actions described above. Rather, the specific features and actions described above are merely sample forms of implementing a claim.

What is claimed is:

1. A functional component loading method applied to an audience terminal, comprising:
   receiving video data corresponding to a live-stream accessed by the audience terminal, where in the video data is generated by a streamer terminal corresponding to the live-stream; and
   loading a functional component corresponding to a function identification in response to the video data including the function identification, wherein the function identification indicates an enabled function of the streamer terminal, and the functional component is used for implementing the enabled function;
   wherein the loading the functional component corresponding to the function identification comprises:
   obtaining a function state of the function identification corresponding to the live-stream from a server; and
   loading the functional component corresponding to the function identification in response to determining that the function state is an enabled state;
   wherein the enabled state is recorded by the server after receiving an enable notification message, and the enable notification message is sent by the streamer terminal for the enabled function.

2. The method according to claim 1, wherein the loading the functional component corresponding to the function identification in response to the video data including the function identification comprises:
   loading the functional component corresponding to the function identification in response to a target image frame in the video data including the function identification, wherein a same time interval exists between any two adjacent target image frames.

3. The method according to claim 1, wherein the loading the functional component corresponding to the function identification comprises:
   loading the functional component corresponding to the function identification in response to determining that the functional component corresponding to the function identification is not loaded.

4. The method according to claim 3, wherein the obtaining the function state of the function identification corresponding to the live-stream from the server comprises:
   obtaining the function state of the function identification corresponding to the live-stream from the server in response to determining that a number of times for obtaining the function state of the function identification corresponding to the live-stream from the server is less than a preset maximum number of times; and
   updating the number of times for obtaining the function state of the function identification corresponding to the live-stream from the server.

5. The method according to claim 4, further comprising:
   sending abnormal state information to the server in response to determining that the number of times for obtaining the function state of the function identification corresponding to the live-stream from the server is greater than or equal to the preset maximum number of times, wherein the abnormal state information comprises the function identification, and the abnormal state information is used to indicate that a function corresponding to the function identification is in an abnormal state.

6. The method according to claim 2, wherein the target image frame comprises supplemental enhancement information and the function identification is included in the supplemental enhancement information.

7. A data processing method, applied to a streamer terminal, comprising:
   adding a function identification that indicates an enabled function of the streamer terminal to generated video data; and
   sending the video data to an audience terminal receiving a live-stream of the streamer terminal;
   wherein the function identification is provided for the audience terminal to:
   obtain a function state of the function identification corresponding to the live-stream from a server; and
   load a functional component corresponding to the function identification in response to determining that the function state is an enabled state, wherein the functional component is used for implementing the enabled function; wherein the enabled state is recorded by the server after receiving an enable notification message, and the enable notification message is sent by the streamer terminal for the enabled function.

8. The method according to claim 7, wherein the function identification is located in at least two target image frames in the video data, and a same time interval exists between any two adjacent target image frames.

9. The method according to claim 8, wherein the target image frame comprises supplemental enhancement information and the function identification is included in the supplemental enhancement information.

10. The method according to claim 7, wherein the function identification of the enabled function on the streamer terminal is recorded by the streamer terminal after receiving an enable confirmation message, and the enable confirmation message is sent by the server after receiving an enable request message of a function from the streamer terminal.

11. An audience terminal, comprising:
at least one processor and memory; and
a communication interface connected with the at least one processor;
the memory stores computer-executed instructions;
the at least one processor executes the computer-executed instructions stored in the memory to enable the at least one processor to:
receive, through the communication interface, video data corresponding to a live-stream accessed by the audience terminal, wherein the video data is generated by a streamer terminal corresponding to the live-stream; and
load a functional component corresponding to a function identification in response to the video data including the function identification, wherein the function identification indicates an enabled function of the streamer terminal, and the functional component is used for implementing the enabled function;
wherein the at least one processor is further configured to:
obtain a function state of the function identification corresponding to the live-stream from a server; and load the functional component corresponding to the function identification in response to determining that the function state is an enabled state;
wherein the enabled state is recorded by the server after receiving an enable notification message, and the enable notification message is sent by the streamer terminal for the enabled function.

12. A streamer terminal, comprising:
at least one processor and memory; and
a communication interface connected with the at least one processor;
the memory stores computer-executed instructions;
the at least one processor executes the computer-executed instructions stored in the memory to enable the at least one processor to execute the method according to claim 7.

13. A non-transitory computer-readable storage medium, wherein the computer-readable memory medium stores the computer-executed instructions, when the computer execution instructions are executed by the computing device, enables the computing device to execute the method according to claim 1.

14. The audience terminal according to claim 11, wherein the at least one processor is further configured to:
load the functional component corresponding to the function identification in response to a target image frame in the video data including the function identification, wherein a same time interval exists between any two adjacent target image frames.

15. The audience terminal according to claim 11, wherein the at least one processor is further configured to:
load the functional component corresponding to the function identification in response to determining that the functional component corresponding to the function identification is not loaded.

16. The audience terminal according to claim 15, wherein the at least one processor is further configured to:
obtain the function state of the function identification corresponding to the live-stream from the server in response to determining that a number of times for obtaining the function state of the function identification corresponding to the live-stream from the server is less than a preset maximum number of times; and
update the number of times for obtaining the function state of the function identification corresponding to the live-stream from the server.

17. The audience terminal according to claim 16, wherein the at least one processor is further configured to:
send abnormal state information to the server in response to determining that the number of times for obtaining the function state of the function identification corresponding to the live-stream from the server is greater than or equal to the preset maximum number of times, wherein the abnormal state information comprises the function identification, and the abnormal state information is used to indicate that a function corresponding to the function identification is in an abnormal state.

18. A non-transitory computer-readable storage medium, wherein the computer-readable memory medium stores the computer-executed instructions, when the computer execution instructions are executed by the computing device, enables the computing device to execute the method according to claim 7.

* * * * *